(12) United States Patent
Chen

(10) Patent No.: US 9,239,582 B2
(45) Date of Patent: Jan. 19, 2016

(54) TIMING CONTROL CIRCUIT AND ELECTRONIC DEVICE USING THE SAME

(71) Applicant: HON HAI PRECISION INDUSTRY CO., LTD., New Taipei (TW)

(72) Inventor: Hsin-Che Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 349 days.

(21) Appl. No.: 13/890,255

(22) Filed: May 9, 2013

(65) Prior Publication Data
US 2014/0062447 A1 Mar. 6, 2014

(30) Foreign Application Priority Data

Sep. 3, 2012 (TW) .............................. 101132091 A

(51) Int. Cl.
*H02J 1/00* (2006.01)
*G05F 1/10* (2006.01)
(52) U.S. Cl.
CPC ........................ *G05F 1/10* (2013.01)
(58) Field of Classification Search
CPC ......................................................... G05F 1/10
USPC .......................................................... 307/75
See application file for complete search history.

(56) References Cited

U.S. PATENT DOCUMENTS

| 4,128,771 | A | * | 12/1978 | Domenico | ................ G05F 1/10 307/52 |
| 5,153,452 | A | * | 10/1992 | Iwamura | ................ G05F 1/465 327/530 |
| 6,097,616 | A | * | 8/2000 | Iwasaki | .............. G03G 15/5004 363/97 |
| 6,160,697 | A | * | 12/2000 | Edel | ..................... G01R 15/185 361/143 |
| 2010/0091000 | A1 | | 4/2010 | Lee et al. | |
| 2010/0223485 | A1 | | 9/2010 | Zou | |

FOREIGN PATENT DOCUMENTS

TW M386532 8/2010

* cited by examiner

*Primary Examiner* — Jared Fureman
*Assistant Examiner* — Duc M Pham
(74) *Attorney, Agent, or Firm* — Novak Druce Connolly Bove + Quigg LLP

(57) ABSTRACT

A timing control circuit for an electronic device is disclosed. The timing control circuit includes a first power supply voltage input, a second power supply voltage input, a third power supply voltage input, a first output, a second output, a switch circuit and a control circuit. The control circuit is connected with the switch circuit and configured to turn the switch circuit on/off. The switch circuit is connected between the first power supply voltage input and the first output and responds to the control circuit to delay, by means of adjustable (different capacitance values) capacitors, the power connections when the electronic device is turned on but to immediately disconnect the power connections when the electronic device is shut down, thereby controlling the sequence of power applications and avoiding the need for expensive chips or circuits.

14 Claims, 2 Drawing Sheets

TIMING CONTROL CIRCUIT AND ELECTRONIC DEVICE USING THE SAME

BACKGROUND

1. Technical Field

Embodiments of the present disclosure relate to power supply management circuits and, particularly, to a timing control circuit and electronic device using the same.

2. Description of related art

Many electronic devices use dedicated chips to control the sequence of the power supplies of a display when the electronic devices are started, however, using such dedicated chips are expensive.

DETAILED DESCRIPTION

The disclosure, including the accompanying drawings in which like references indicate similar elements, is illustrated by way of examples and not by way of limitation. It should be noted that references to "an" or "one" embodiment in this disclosure are not necessarily to the same embodiment, and such references mean "at least one."

Figure 1:
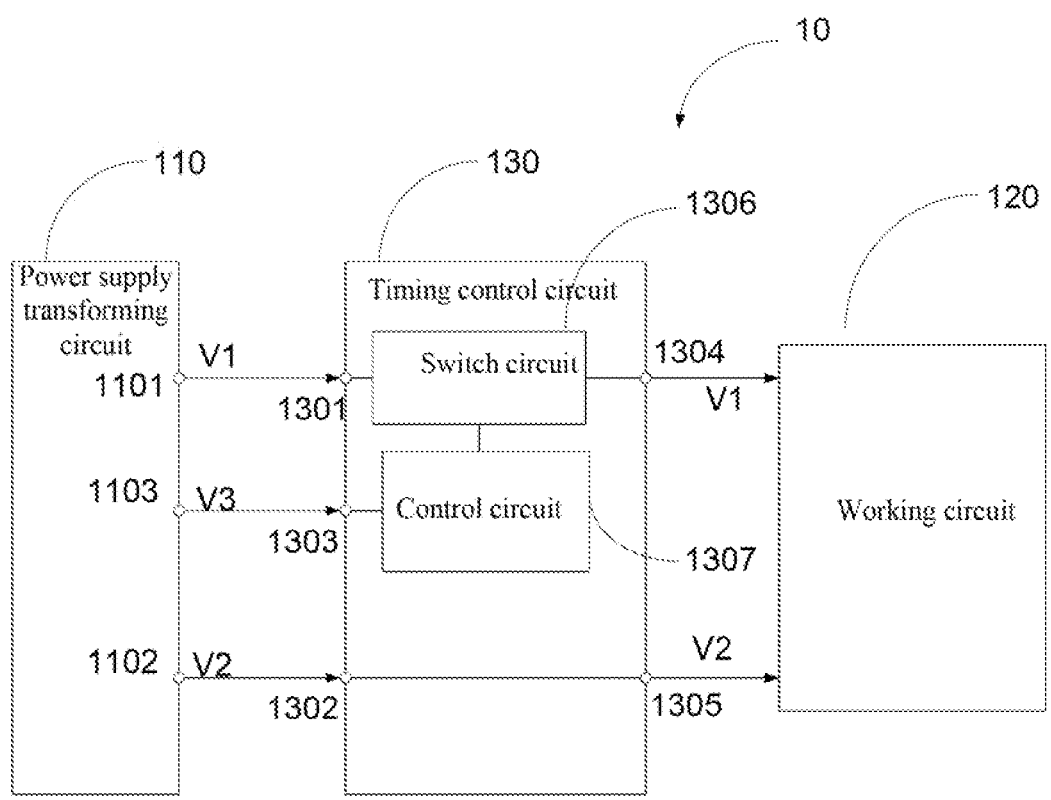
FIG. 1 is a block diagram of one embodiment of a power supply circuit for a display of an electronic device.

FIG. 1 is a block diagram of one embodiment of a power supply circuit of an electronic device 10. The electronic device 10 includes a power supply transforming circuit 110, a working circuit 120 and a timing control circuit 130. When the electronic device 10 is turned on, the power supply transforming circuit 110 converts an outer power supply voltage into a first power supply voltage V1, a second power supply voltage V2 and a third power supply voltage V3. The first power supply voltage V1 and the second power supply voltage V2 are supplied to the working circuit 120, and the third power supply voltage V3 is supplied to the timing control circuit 130. The working circuit 120 is a dedicated circuit or chip for realizing a particular function, such as a display circuit, a storage circuit or a processor. The timing control circuit 130 is connected between the power supply transforming circuit 110 and the working circuit 120 for controlling the sequence of application of the first power supply voltage V1 and the second power supply voltage V2 supplied to the working circuit 120.

The timing control circuit 130 includes a first power supply voltage input 1301, a second power supply voltage input 1032, a third power supply voltage input 1303, a first output 1304, a second output 1305, a control circuit 1306, and a switch circuit 1307. The first power supply voltage input 1301 receives the first power supply voltage V1, the second power supply voltage input 1302 receives the second power supply voltage V2, and the third power supply voltage input 1303 receives the third power supply voltage V3. The first output 1304 outputs the first power supply voltage V1, the second output 1305 outputs the second power supply voltage V2. The control circuit 1306 is connected between the third power supply voltage input 1303 and the switch circuit 1307, and can turn on and turn off the switch circuit 1306. The switch circuit 1307 is connected between the first power supply voltage input 1301 and the first output 1304, and connects or disconnects the first power supply voltage input 1301 and the first output 1304 in response to the control circuit 1306. The second output 1305 is directly connected to the second power supply voltage input 1302. When the electronic device 10 is turned on, the control circuit 1306 receives the third power supply voltage V3 and delays the switching on of the switch circuit 1307, so the first power supply voltage V1 is supplied to the working circuit 120 later than the second power supply voltage V2. When the electronic device is shut down, the control circuit 1306 causes the switch circuit 1307 to cut off immediately and stops the power supply voltage V1 supplying the working circuit 120 earlier than the delayed second power supply voltage V2.

Figure 2:
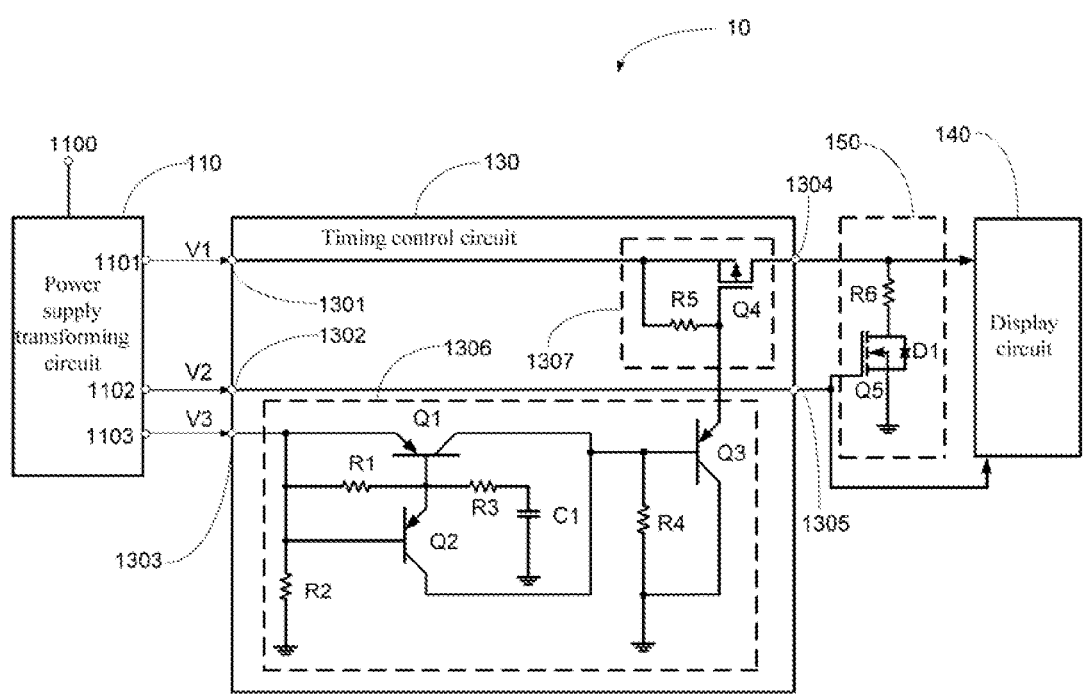
FIG. 2 is a detail circuit diagram of one embodiment of the timing control circuit in FIG. 1.

FIG. 2 is a detailed circuit diagram of the timing control circuit in FIG. 1. The working circuit 120 is a display circuit 140 of the electronic device 10. The power supply transforming circuit 110 includes a power input 1100 for receiving an outer power supply voltage and a first power supply voltage output 1101, a second power supply voltage output 1102, and a third power supply voltage output 1103. The power supply transforming circuit 110 converts the outer power supply voltage into the first power supply voltage V1, the second power supply voltage V2 and the third power supply voltage V3 and outputs the first power supply voltage V1, the second power supply voltage V2 and the third power supply voltage V3, respectively from the first power supply voltage output 1101, the second power supply voltage output 1102, and the third power supply voltage output 1103.

In the embodiment, the first power supply voltage V1 is a driving voltage, the second power supply voltage V2 is a digital-logic voltage, and the third power supply voltage V3 is a reference voltage. The driving voltage V1 drives the display circuit 140, the logical voltage V2 provides a digital-logic voltage to the display circuit 140, and the reference voltage V3 is provided to the control circuit 1306. The control circuit 1306 is connected between the third power supply voltage input 1303 and the switch circuit 1307, and turns on or turns off the switch circuit 1307 and further controls the driving voltage V1 to be supplied to or not to be supplied to the display circuit 140. The second power supply voltage input 1302 is directly connected to the second output 1305 and further connected to the working circuit 140, the digital-logic voltage V2 is directly supplied to the display circuit 140.

The control circuit 1306 includes a first switch component Q1, a second switch component Q2, a third switch component Q3, a capacitor C1, and resistors R1-R4. The first switch component Q1, the second switch component Q2 and the third switch component Q3 are three PNP bipolar transistors.

Specifically, the base of the bipolar transistor Q1 is connected to the third power supply input 1303 through the resistor R1, the emitter of the bipolar transistor Q1 is directly connected to the third power supply input 1303, and the collector of the bipolar transistor Q1 is connected to the base of the bipolar transistor Q3. The base of the bipolar transistor Q2 is connected with the third power supply input 1303 and grounded through resistor R2, the emitter of the bipolar transistor Q2 is connected to the base of the bipolar transistor Q1, and the collector of the bipolar transistor Q2 is connected to the collector of the bipolar transistor Q1 and to the base of the bipolar transistor Q3. The first end of the capacitor C1 is connected to the third power supply input 1303 through the resistors R2 and R3, and the second end of the capacitor is grounded. The first end of the capacitor C1 is also connected to the base of the bipolar transistor Q1 and to the emitter of the bipolar transistor Q2 through the resistor R3. The base of the third bipolar transistor Q3 is grounded through resistor R4, the collector of the third bipolar transistor is directly grounded and the emitter of the bipolar transistor Q3 is connected to the switch circuit 1307.

The switch circuit 1307 includes a fourth switch component Q4 and a fifth resistor R5, the fourth switch component Q4 is a p-type metal-oxide-semiconductor field-effect transistor (PMOSFET) Q4. The resistor R5 is connected between the source and the gate of the PMOSFET Q4. The source of the PMOSFET Q4 is connected to the first power supply voltage input 1301, the drain of the PMOSFET Q4 is connected to the first output 1304, and the gate of the PMOSFET Q4 is connected to the emitter of the bipolar transistor Q3.

In the embodiment, when the electronic device 10 is started, the power supply transforming circuit 110 converts an outer power supply voltage into the driving voltage V1, the digital-logic voltage V2 and the reference voltage V3. The first power supply voltage input 1301 receives the driving voltage V1, the second power supply voltage input 1302 receives the digital-logic voltage V2 and the third power supply voltage input 1303 receives the reference voltage V3. The capacitor C1 is then charged. Since the base of the bipolar transistor Q1 is grounded through the resistors R1 and R2, the bipolar transistor Q1 is turned on and the base of the bipolar transistor Q3 gets a digital-high voltage from the third power supply input 1303 through the bipolar transistor Q1 in the "on" state, so the bipolar transistor Q3 is cut off. Meanwhile, the gate of the PMOSFET Q4 gets a digital-high voltage from the first power supply input 1301 through the resistor R5, so the PMOSFET Q4 is cut off. The first power supply voltage input 1301 is disconnected from the first output 1304 and the driving voltage V1 is not supplied to the display circuit 140, resulting in non-operation of the display circuit 140. At the same time, the base of the transistor Q2 gets a digital-high voltage from the third power supply input 1303, causing the bipolar transistor Q2 to be cut off.

When the capacitor C1 is charged to a certain level, the voltage of the base of the bipolar transistor Q1 is pulled to a digital-high level by the capacitor C1 which causes the bipolar transistor Q1 to be cut off. The base of the bipolar transistor Q3 gets a digital-low voltage from the ground through the resistor R4 and causes the bipolar transistor Q3 to be turned on, so the gate of the PMOSFET Q4 connected is grounded and receives a low level voltage, causing the PMOSFET Q4 to be turned on. The first power supply voltage input 1301 and the first output 1301 are connected to each other, and the driving voltage is thus supplied to the display circuit 140 and the display circuit 140 starts to work.

Because some time is needed for charging the capacitor C1, the driving voltage supplied to the display circuit 140 is delayed. However, when the electronic device 10 starts, the second power supply voltage input 1302 and the second output 1305 are connected immediately and the digital-logic voltage V2 is directly supplied to the display circuit 140, so the digital-logic voltage V2 is supplied to the display circuit 140 prior to the driving voltage V1 being received.

In the embodiment, the interval between the digital-logic voltage V2 and the subsequent driving voltage V1 being supplied to the display circuit 140 can be adjusted by changing the capacitance of capacitor C1.

When the electronic device is shut down, the power supply transforming circuit 110 stops giving any output. The capacitor C1 then begins to discharge through the resistor R3. The emitter of the bipolar transistor Q2 connected to the first end of the capacitor C1 through the resistor R3 is at a digital-high level, the base of the bipolar transistor Q2 is grounded, thereby causing the bipolar transistor Q2 to be on. The base of the bipolar transistor Q3 gets a digital-high level from the capacitor C1 through the bipolar transistor Q2 in the "on" state, and the bipolar transistor Q3 is cut off, causing the PMOSFET Q4 to be cut off. The first power supply voltage input 1301 and the first output 1304 are disconnected, and the driving voltage V1 is immediately stopped from supplying the display circuit 140. The digital-logical voltage V2 will endure for a while after the driving voltage V1 is stopped, so the cessation of the logical voltage V2 is after the cessation of the driving voltage V1.

In the embodiment, the electronic device also includes a discharging circuit 150 for the display circuit 140 to release its built-up and stored voltage, the discharging circuit 150 is connected between the working circuit 140 and the ground as a discharging path of the display circuit 140 when the electronic device 10 is shut down. The discharging circuit 150 includes a fifth switch component Q5, a diode D1 and a resistor R6. In the embodiment, the fifth switch component Q5 is an n-type-metallic-oxide-semiconductor-field-effect transistor (NMOSFET) Q5, the gate of the NMOSFET Q5 is connected to the second output 1305, the source of the NMOSFET Q5 is grounded, and the drain of the NMOSFET Q5 is connected to the first output 1304 through resistor R6. The diode D1 is connected between the source and the drain of the NMOSFET Q5, the positive pole of the diode D1 is connected to the source of the transistor Q5, and the negative pole of the diode D1 is connected to the drain of the NMOSFET Q5.

At the moment the power supply transforming circuit 110 stops converting the outer power supply voltage, the NMOSFET Q5 still conducts, thus the built-up voltage of the display circuit 140 discharges quickly from the discharging circuit 150, the display circuit being then disconnected from any power supply.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A timing control circuit for controlling a sequence of a first power supply voltage and a second power supply voltage when an electronic device is turned on or turned off, comprising:
    a first power supply voltage input configured to receive a first power supply voltage when the electronic device is turned on;
    a second power supply voltage input configured to receive a second power supply voltage when the electronic device is turned on;
    a third power supply voltage input configured to receive a third power supply voltage when the electronic device is turned on;
    a first output to be connected to a switch circuit and a working circuit of the electronic device, and to output the first power supply voltage to the working circuit of the electronic device;
    a second output to be connected to the second power supply voltage input and the working circuit, and to output the second power supply voltage to the working circuit of the electronic device;
    a switch circuit connected between the first power supply voltage input and the first output, and to control the first power supply voltage input to be connected to or disconnected from the first output; and
    a control circuit connected between the third power supply voltage input and the switch circuit, and to control the switch circuit to delay connecting the first power supply input to the first output after receiving the third power supply voltage when the electronic device is turned on, so that the first power supply voltage is supplied to working circuit later than the second power supply voltage when the electronic device is turned on, and further to control the switch circuit to disconnect the first power supply input and the first output immediately when the electronic device is shut down, so that the second power supply voltage is stopped to be supplied to the working circuit later than the first power supply voltage when the electronic device is shut down.

2. The timing control circuit as claimed in the claim 1, wherein the first power supply voltage is a driving voltage for driving the working circuit, the second power supply voltage is a logical voltage for providing a logical voltage to the working circuit, and the third power supply voltage is reference voltage for providing a reference voltage to the timing control circuit.

3. The timing control circuit as claimed in claim 1, wherein the control circuit comprises:
   a first bipolar transistor, wherein a base of the first bipolar transistor is connected to the third power supply voltage input through a first resistor, and an emitter of the first bipolar transistor is connected to the third power supply voltage input;
   a second bipolar transistor, wherein a base of the second bipolar transistor is connected to the third power supply voltage input and grounded through a second resistor, and an emitter of the second bipolar transistor is connected to the base of the first bipolar transistor;
   a capacitor, wherein a first end of the capacitor is connected to the base of the first bipolar transistor and the emitter of the second bipolar transistor through a third resistor, and a second end of the capacitor is grounded; and
   a third bipolar transistor, wherein a base of the third bipolar transistor is connected to a collector of the first bipolar transistor and a collector of the second bipolar transistor and grounded through a forth resistor, a collector of the third bipolar grounded, and an emitter of the third bipolar transistor is connected with the switch circuit.

4. The timing control circuit as claimed in claim 3, wherein the first bipolar transistor, the second bipolar transistor and the third bipolar transistor are PNP bipolar transistors.

5. The timing control circuit as claimed in claim 1, wherein the switch circuit comprises a first metal-oxide-semiconductor field-effect transistor (MOSFET) and a fifth resistor, wherein a source of the of the first MOSFET is connected with the first power supply input, a drain of the first MOSFET is connected with the first output, a gate of the first MOSFET is connected to the source of the first MOSFET through the fifth resistor, the gate of the first MOSFET is further connected to the emitter of the third bipolar transistor of the control circuit.

6. The timing control circuit as claimed in claim 5, wherein the MOSFET is a p-type MOSFET.

7. An electronic device comprising:
   a working circuit;
   a power supply transforming circuit for converting an outer power supply voltage into a first power supply voltage, a second power supply voltage and a third power supply voltage;
   a first power supply voltage input connected to a first output of the power supply transforming circuit configured to receive a first power supply voltage from the first output of the power supply transforming circuit when the electronic device is power-on;
   a second power supply voltage input connected to a second output of the power supply transforming circuit configured to receive a second power supply voltage from the second output of the inner power supply transforming circuit when the electronic device is power-on;
   a third power supply voltage input connected to a third output of the power supply transforming circuit configured to receive a third power supply voltage from the third output of the power supply transforming circuit when the electronic device is power-on;
   a first output to output the first power supply voltage to the working circuit;
   a second output to output the second power supply voltage to the working circuit;
   a switch circuit connected between the first power supply voltage input and the first output, and to control the first power supply voltage input to be connected to or disconnected from the first output;
   a control circuit connected between the third power supply voltage input and the switch circuit, and to control the switch circuit to delay connecting the first power supply input to the first output after receiving the third power supply voltage when the electronic device is turned on, so that the first power supply voltage is supplied to working circuit later than the second power supply voltage when the electronic device is turned on, and further to control the switch circuit to disconnect the first power supply input and the first output immediately when the electronic device is shut down, so that the second power supply voltage is stopped to be supplied to the working circuit later than the first power supply voltage when the electronic device is shut down; and
   a discharging circuit connected between the working circuit and the ground, and configured to connect the working circuit and the ground when the electronic device is shut down.

8. The electronic device as claimed in the claim 7, wherein the first power supply voltage is a driving voltage for driving the working circuit, the second power supply voltage is a logical voltage for providing a logical voltage to the working circuit and the third power supply voltage is reference voltage for providing a reference voltage to the timing control circuit.

9. The electronic device as claimed in claim 7, wherein the control circuit comprises:
   a first bipolar transistor, wherein a base of the first bipolar transistor is connected to the third power supply voltage input through a first resistor, and an emitter of the first bipolar transistor is connected to the third power supply voltage input;
   a second bipolar transistor, wherein a base of the second bipolar transistor is connected to the third power supply voltage input and grounded through a second resistor, and an emitter of the second bipolar transistor is connected to the base of the first bipolar transistor;
   a capacitor, wherein a first end of the capacitor is connected to the base of the first bipolar transistor and the emitter of the second bipolar transistor through a third resistor, and a second end of the capacitor is grounded.

10. The electronic as claimed in claim 9, wherein the first bipolar transistor, the second bipolar transistor and the third bipolar transistor are PNP bipolar transistors.

11. The electronic device as claimed in claim 7, wherein the switch circuit comprises a first metal-oxide-semiconductor field-effect transistor (MOSFET) and a fifth resistor, wherein a source of the of the first MOSFET is connected with the first power supply input, a drain of the first MOSFET is connected with the first output, a gate of the first MOSFET is connected to the source of the first MOSFET through the fifth resistor, the gate of the first MOSFET is further connected to the emitter of the third bipolar transistor of the control circuit.

12. The electronic device as claimed in claim 11, wherein the first MOSFET is a p-type MOSFET.

13. The electronic device as claimed in claim 7, wherein the discharging circuit comprises a second MOSFET, a diode and a sixth resistor, the gate of the second MOSFET is connected to with the second output, the source is grounded and the drain is connected with the first output through the sixth resistor, the positive pole of the diode is connected to the source of the transistor and the negative pole of the diode is connected to the drain of the transistor.

14. The electronic device as claimed in claim 13, wherein the second MOSFET is a n-type MOSFET.

* * * * *